(12) United States Patent
Ray et al.

(10) Patent No.: US 10,965,663 B2
(45) Date of Patent: Mar. 30, 2021

(54) TROUBLESHOOTING SINGLE SIGN ON FAILURE

(71) Applicant: Microsoft Technology Licensing, LLC, Redmond, WA (US)

(72) Inventors: Mayukh Ray, Sammamish, WA (US); Luis Carlos Leon Plata, Seattle, WA (US); Ivona Furtado, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 266 days.

(21) Appl. No.: 16/046,889

(22) Filed: Jul. 26, 2018

(65) Prior Publication Data
US 2020/0036698 A1    Jan. 30, 2020

(51) Int. Cl.
*H04L 29/06* (2006.01)
*G06N 20/00* (2019.01)
*G06F 11/07* (2006.01)
*H04W 12/06* (2021.01)

(52) U.S. Cl.
CPC ...... *H04L 63/0815* (2013.01); *G06F 11/0709* (2013.01); *G06F 11/079* (2013.01); *G06N 20/00* (2019.01); *H04W 12/06* (2013.01)

(58) Field of Classification Search
CPC ..... H04L 63/0815; H04L 69/40; G06N 20/00; G06F 11/0709; G06F 11/079; G06F 11/0763; G06F 11/0769; G06F 11/0793; H04W 12/06
See application file for complete search history.

(56) References Cited

U.S. PATENT DOCUMENTS

| | | | | |
|---|---|---|---|---|
| 8,762,947 B2* | 6/2014 | Lee | ...................... | G06F 11/362 717/124 |
| 8,869,258 B2* | 10/2014 | Wu | ........................ | H04L 69/40 726/9 |
| 9,069,737 B1* | 6/2015 | Kimotho | ............. | G06F 11/0793 |

(Continued)

OTHER PUBLICATIONS

"AuthNRequest", Retrieved from: https://developers.onelogin.com/saml/online-tools/sign/authnrequest, Retrieved On:May 2, 2018, 3 Pages.

(Continued)

*Primary Examiner* — James R Turchen
(74) *Attorney, Agent, or Firm* — Workman Nydegger (57) ABSTRACT

The automatic troubleshooting of failed single sign on attempts via an identity provider to a service provider. When an error message is encountered due to that failed single sign on attempt, that error message is used to automatically identify a root cause of the failure of the single sign on attempt. In some embodiments, a resolution of the failure is also identified, and a tool for the resolution automatically provided to the user. Such failures in single sign on attempts usually are due to improper configuration information being provided to the identity provider. The principles described herein allow a user to test ahead of time whether they have provided proper configuration information to the identity provider, and potentially correct any problems in the single sign on experience in advance, perhaps well in advance of actually needing a resource provided by the service provider.

20 Claims, 5 Drawing Sheets

(56) References Cited

U.S. PATENT DOCUMENTS

| | | | |
|---|---|---|---|
| 9,946,631 B1* | 4/2018 | Cook | G06F 16/24568 |
| 10,628,428 B1* | 4/2020 | Whelan | G06F 16/22 |
| 2003/0149781 A1* | 8/2003 | Yared | H04L 63/0815 |
| | | | 709/229 |
| 2005/0283451 A1* | 12/2005 | Abrashkevich | G06N 5/022 |
| | | | 706/46 |
| 2007/0168758 A1* | 7/2007 | Kolb | G06F 9/453 |
| | | | 714/46 |
| 2008/0162688 A1* | 7/2008 | Reumann | G06Q 10/10 |
| | | | 709/224 |
| 2009/0292941 A1* | 11/2009 | Ganai | G06F 11/3636 |
| | | | 714/2 |
| 2011/0103265 A1* | 5/2011 | Dilipkumar Saklikar | |
| | | | H04L 63/0815 |
| | | | 370/259 |
| 2011/0246969 A1* | 10/2011 | Lee | H04L 63/0823 |
| | | | 717/125 |
| 2012/0023565 A1* | 1/2012 | Tumanyan | G06F 21/41 |
| | | | 726/8 |
| 2014/0007198 A1* | 1/2014 | Durbha | H04L 63/102 |
| | | | 726/4 |
| 2014/0310222 A1* | 10/2014 | Davlos | G06F 11/2294 |
| | | | 706/46 |
| 2015/0032669 A1* | 1/2015 | Winnick | G06N 5/04 |
| | | | 706/11 |
| 2015/0071416 A1* | 3/2015 | Gottlieb | H04M 3/24 |
| | | | 379/22.03 |
| 2015/0100892 A1* | 4/2015 | Cronin | G06Q 10/06 |
| | | | 715/747 |
| 2015/0199229 A1* | 7/2015 | Amendjian | G06F 3/0481 |
| | | | 714/57 |
| 2015/0350212 A1* | 12/2015 | Amiri | H04L 63/10 |
| | | | 726/1 |
| 2016/0080360 A1* | 3/2016 | Child | G06F 21/41 |
| | | | 726/6 |
| 2016/0173816 A1* | 6/2016 | Huenerfauth | H04N 7/14 |
| | | | 348/14.02 |
| 2016/0254968 A1* | 9/2016 | Ebtekar | H04L 41/12 |
| | | | 709/223 |
| 2016/0301684 A1* | 10/2016 | He | H04L 63/108 |
| 2016/0301685 A1* | 10/2016 | Mishra | H04L 51/046 |
| 2016/0330095 A1* | 11/2016 | Numakami | H04L 65/1069 |
| 2017/0235628 A1* | 8/2017 | Nguyen | G06F 11/0781 |
| | | | 714/37 |
| 2017/0353991 A1* | 12/2017 | Tapia | H04L 41/147 |
| 2018/0007059 A1* | 1/2018 | Innes | H04L 63/107 |
| 2018/0039501 A1* | 2/2018 | Jain | G06F 9/451 |
| 2018/0109506 A1* | 4/2018 | Helsen | H04L 63/0892 |
| 2018/0164968 A1* | 6/2018 | He | G06F 8/38 |
| 2019/0102243 A1* | 4/2019 | Thompson | G06F 21/6245 |
| 2019/0196937 A1* | 6/2019 | Wang | G06F 11/0715 |

OTHER PUBLICATIONS

"SAML Authentication Exarrple", Retrieved from: https://web.archive.org/web/20160427044622/https://www.samltool.com/generic_sso_req.php, Apr. 27, 2016, 4 Pages.

"Testing SAML with SAML Tracer", Retrieved from: https://developer.okta.com/standards/SAML/saml_tracer, Retrieved On: May 2, 2018, 8 Pages.

"Troubleshoot SAML Assertions", Retrieved from: https://web.archive.org/web/20151007130035/https://developer.salesforce.com/docs/atlas.en-us.identityImplGuide.meta/identityImplGuide/identity_quickstart_troubleshoot.htm, Oct. 7, 2015, 3 Pages.

"International Search Report and Written Opinion Issued in PCT Application No. PCT/US2019/040436", dated Sep. 30, 2019, 10 Pages.

* cited by examiner

TROUBLESHOOTING SINGLE SIGN ON FAILURE

BACKGROUND

Many applications (also called "service providers") are offered over the Internet, often in cloud computing environments. In order to ensure the right services are provided to the right user, it is critical to authenticate the user to verify their identity. Accordingly, service providers often require the user to sign on by providing appropriate credentials. Sometimes, a user would like to sign on to multiple related service providers.

"Single sign on" is a procedure that allows the user to sign onto one of the multiple related service providers, without having to perform a separate sign on for each. An example is when one of the services is an identity provider, and another is a hosting service provider that hosts a resource that the user wants access to. The hosting service provider trusts assertions by the identity provider regarding the identity of users and/or authorizations for those identities.

The user issues a request to access the resource from the hosting service provider. The hosting service provider redirects the user to an identity provider that the hosting service provider trusts. The user then signs on with the identity provider, which provides information (perhaps in the form of a token) that the user then relays back to the hosting service provider. The hosting service provider verifies that the information did indeed originate from the trusted identity provider, and then authenticates the user based on that information. The hosting service provider then decides access control of the resource based on that authentication. In this case, the user really only had a single sign on experience with the identity provider.

When a user sets up a service provider to provide a single sign on experience with a particular identity provider, the user will provide configuration information to the identity provider. This configuration information is used by the identity provider when receiving a sign on request from the user, and to send appropriate information back to the user for relay to the hosting service provider. If there is something wrong with the configuration information, the single sign on experience may fail. That is, the identity provider might respond with an error message. Even if there was no error message, and the identity provider provides the information in the form of a token, the service provider itself may still respond with an error message.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the automatic troubleshooting of failed single sign on attempts via an identity provider to a service provider. When an error message is encountered due to that failed single sign on attempt, that error message is used to automatically identify a root cause of the failure of the single sign on attempt. In some embodiments, a resolution of the failure is also identified, and a tool for the resolution automatically provided to the user.

Such failures in single sign on attempts usually are due to improper configuration information being provided to the identity provider. The principles described herein allow a user to test ahead of time whether they have provided proper configuration information to the identity provider, and potentially correct any problems in the single sign on experience in advance, perhaps well in advance of actually needing a resource provided by the service provider. Thus, the user can more easily configure the single sign on experience, and reduce errors in single sign on attempts during subsequent requests to the service providers. This enhances the performance of the identity provider and service provider.

The error message may be issued by the identity provider, in which case the sign on attempt stops there. On the other hand, even if the identity provider does not reply with an error message, but returns back information (e.g., in the form of a token), the service provider itself may respond to that information with an error message. For instance, perhaps the service provider cannot properly interpret a token provided by the identity provider. Thus, in accordance with some embodiments herein, the error that is encountered due to that failed single sign on attempt might be provided by the identity provider, or might alternatively be provided by the service provider. The principles described in accordance with those embodiments might resolve either type of error message.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Therefore, these drawings depict only example embodiments of the invention and are not therefore to be considered to be limiting of the scope of the invention. With this in mind, example embodiments of the invention will be described and explained with reference to the accompanying drawings in which:

FIG. 7 illustrates a testing and troubleshooting tool environment that may be used to help a user to test and troubleshoot problems when encountering errors performing single sign on.

DETAILED DESCRIPTION

At least some embodiments described herein relate to the automatic troubleshooting of failed single sign on attempts via an identity provider to a service provider. When an error message is encountered due to that failed single sign on attempt, that error message is used to automatically identify a root cause of the failure of the single sign on attempt. In some embodiments, a resolution of the failure is also identified, and a tool for the resolution automatically provided to the user.

Such failures in single sign on attempts usually are due to improper configuration information being provided to the identity provider. The principles described herein allow a user to test ahead of time whether they have provided proper configuration information to the identity provider, and potentially correct any problems in the single sign on experience in advance, perhaps well in advance of actually needing a resource provided by the service provider. Thus, the user can more easily configure the single sign on experience, and reduce errors in single sign on attempts during subsequent requests to the service providers. This enhances the performance of the identity provider and service provider as viewed by the end user.

The error message may be issued by the identity provider, in which case the sign on attempt stops there. On the other hand, even if the identity provider does not reply with an error message, but returns back information (e.g., in the form of a token), the service provider itself may respond to that information with an error message. For instance, perhaps the service provider cannot properly interpret a token provided by the identity provider. Thus, in accordance with some embodiments herein, the error that is encountered due to that failed single sign on attempt might be provided by the identity provider, or might alternatively be provided by the service provider. The principles described in accordance with those embodiments might resolve either type of error message.

Because the principles described herein operate in the context of a computing system, a computing system will be described with respect to FIG. 1. Then the use of a computing system to test and troubleshoot a single sign on experience will be described with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
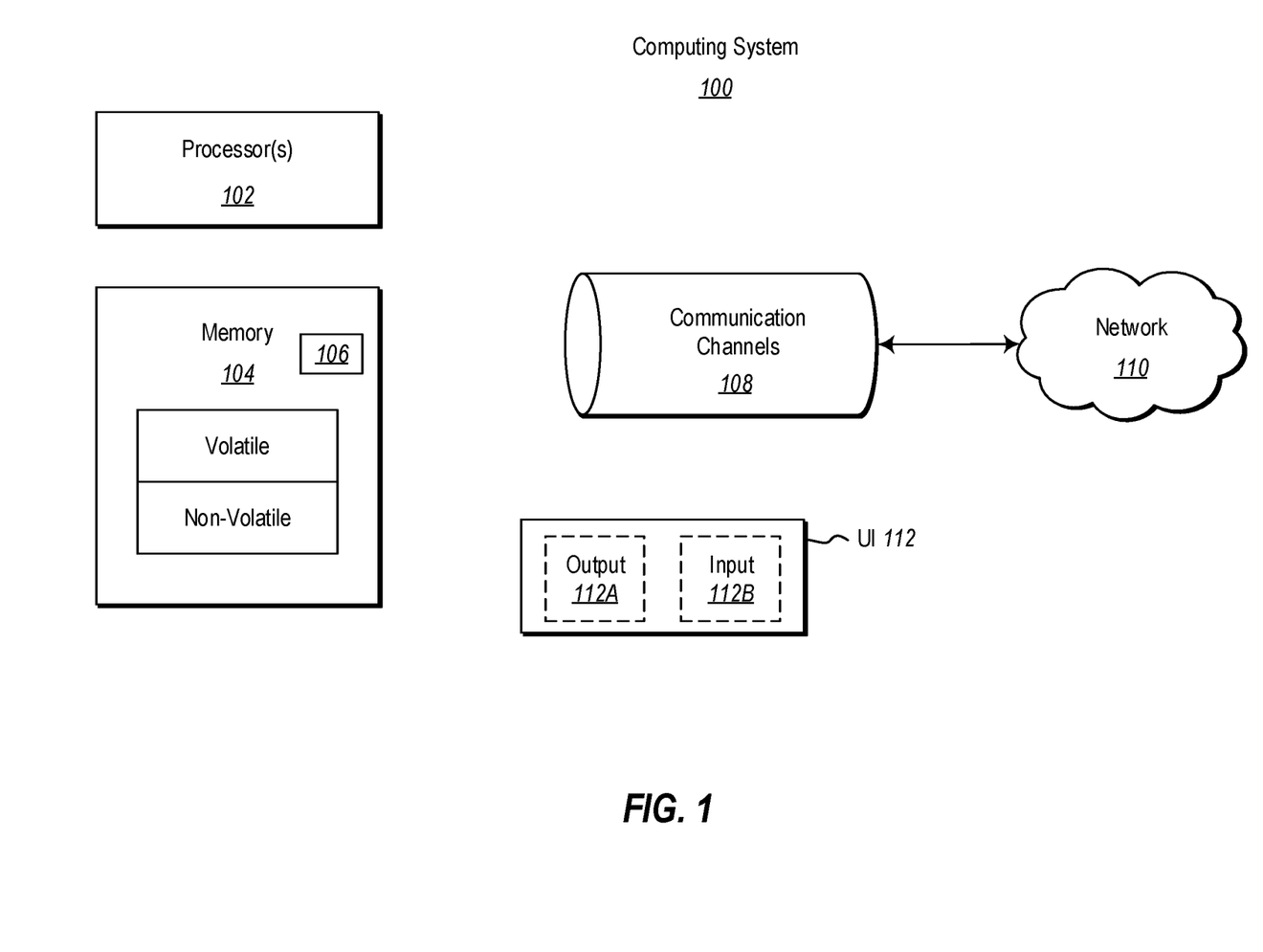
FIG. 1 illustrates an example computer system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The principles described herein allow a user to test a single sign on experience and automatically find a root cause of problems if encountered during that single sign on experience, and potentially troubleshoot those problems. Thus, the environment and process of an example single sign on experience will thus now be described with respect to FIG. 2, so that the concept of the single sign on experience may be more fully understood.

Figure 2:
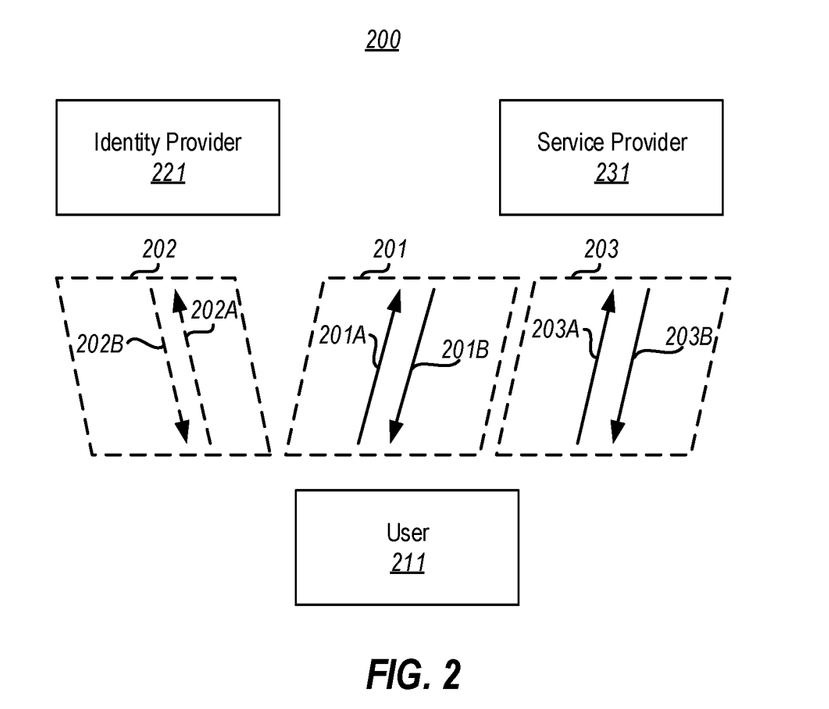
FIG. 2 illustrates an environment in which the single sign on experience may occur, which includes a user that signs onto an identity provider in order to access a resource from a service provider.

FIG. 2 illustrates an environment 200 in which the single sign on experience may occur. The single sign on experience allows a user to be authenticated to multiple service providers by signing onto just one service provider. In the context of FIG. 2, a user 211 authenticates to both the identity provider 221 and the service provider 231 by signing onto just the identity provider 221. That is, the user 211 signs onto the identity provider 221 by providing credentials to the identity provider 221, which allows the user 211 to be identified by the service provider 231 also. The identity provider 221 and the service provider 231 may be computer programs that operate on a computing system that operates within the computing system 100 described above with respect to FIG. 1. Such a computing system 100 may even be a datacenter.

In a typical example, the user 211 might first interact with the service provider 231 to request a service. The term "user" mean at least an application that is capable of issuing requests to service providers. An example of such an application is a browser. Because such browsers typically are operated by a human being, and may be considered an extension of that human being for purposes of interacting with a service provider, the term "user" is appropriate to describe such an application. In this description, the term "user" means an application that interfaces with a service provider, whether or not operating at the direction of a human being or artificial intelligence. Likewise, when the authentication of a user is referred to, that means that the application is being authenticated, or (if the application is being directed by a human being or artificial intelligence) that the authentication of the associated human being or artificial intelligence is being authenticated. Thus, the user 211 may be an executable component(s) that operates on a computing system, such as the computing system 100 described above with respect to FIG. 1.

This interaction is represented by the initial service provider interaction 201. The user 211 issue a resource request 201A to the service provider 231 that is hosting the requested resource. If the service provider 231 has not already authenticated the user 211, the service provider 231 redirects the service provider 211 to the identity provider 221. Specifically, the service provider 231 instructs the user 211 to authenticate to the identity provider 221 via the redirection response 201B.

This causes the user 211 to actually begin the single sign on to the identity provider 221. The interaction with the service provider is represented by the identify provider interaction 202. This interaction is represented by dashed lines to represent that it is a sign on interaction in which the user 211 providers credentials to authenticate. Specifically, the user 211 provides an authentication request 202A to the identity provider 221. The identity provider 221 checks configuration information that the user 211 previously provided to the identity provider 221, and dispatches a response 202B. If the configuration information does not allow the identity provider 221 to authenticate the user 211, then an error message is returned. If the configuration information does allow the identity provider 221 to authenticate the user 211, then the identity provider 221 returns a response that includes data that may be interpreted by the service provider 231. That included data might be a token that may then be provided to the service provider 231.

The user 211 then engages in interaction 203 with the service provider 231. Specifically, the user 211 issues another resource request 203A to the service provider 231, and the service provider 231 returns an appropriate response 203B. This time, the request 203A includes the data (e.g., a token) that was returned by the identity provider 221 in the response 202B. If that data is not sufficient for the service provider 231 to authenticate the user 211, then the service provider 231 return an error message as the response 203B. If the data is sufficient is sufficient for the service provider 231 to authenticate the user 211, then the service provider 231 makes an appropriate determination as to whether that authenticated user is authorized to have the requested access to the resource, and responds as appropriate by granting or denying access to the resource.

Figure 3:
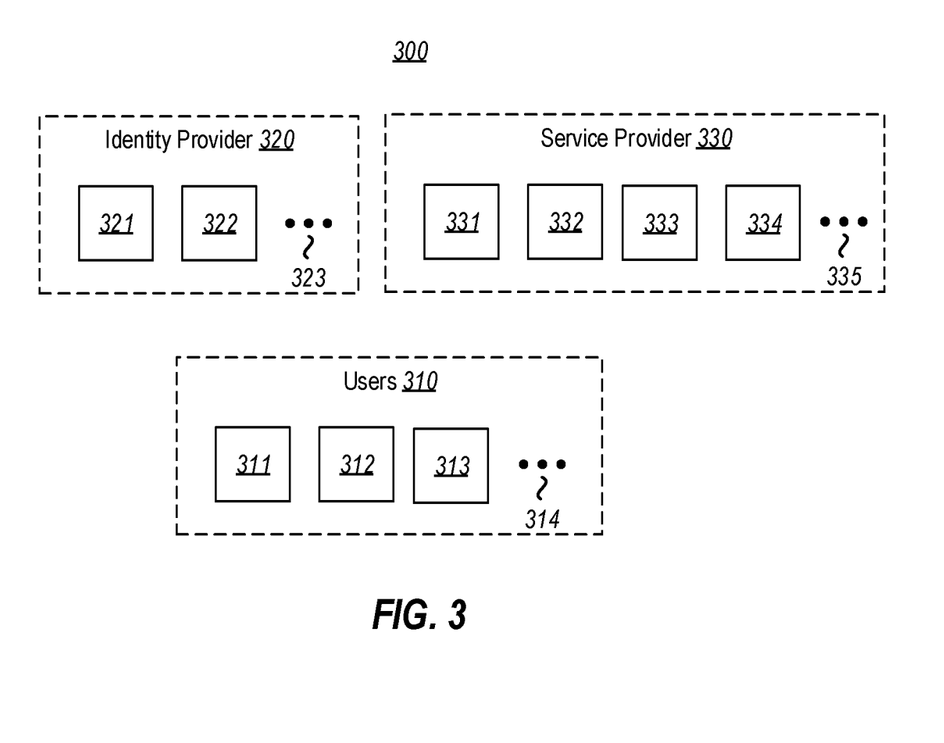
FIG. 3 illustrates an extended environment that includes multiple users, multiple identity providers, and multiple service providers.

FIG. 3 illustrates an extended environment 300 that includes multiple users 310, multiple identity providers 320, and multiple service providers 330. The users 310 includes three users 311, 312 and 313, with the ellipsis 314 representing that the environment 300 may including any number of users. The identity providers 320 include two identity provider 321 and 322, with the ellipsis 323 representing that the environment 300 may including any number of identity providers. The service providers 330 include four service providers 331, 332, 333 and 334, with the ellipsis 335 representing that the environment 300 may include any number of service providers.

As an example, the user 311 of FIG. 3 may be the user 211 of FIG. 2, the identity provider 321 of FIG. 3 may be the identity provider 221 of FIG. 2, and the service provider 331 of FIG. 3 may be the service provider 231 of FIG. 2. Each user may interact with respective identity providers so that the identity providers can provide appropriate identities (e.g., a "token") for the respective user to a respective service provider, as described above with respect to FIG. 2.

Figure 4:
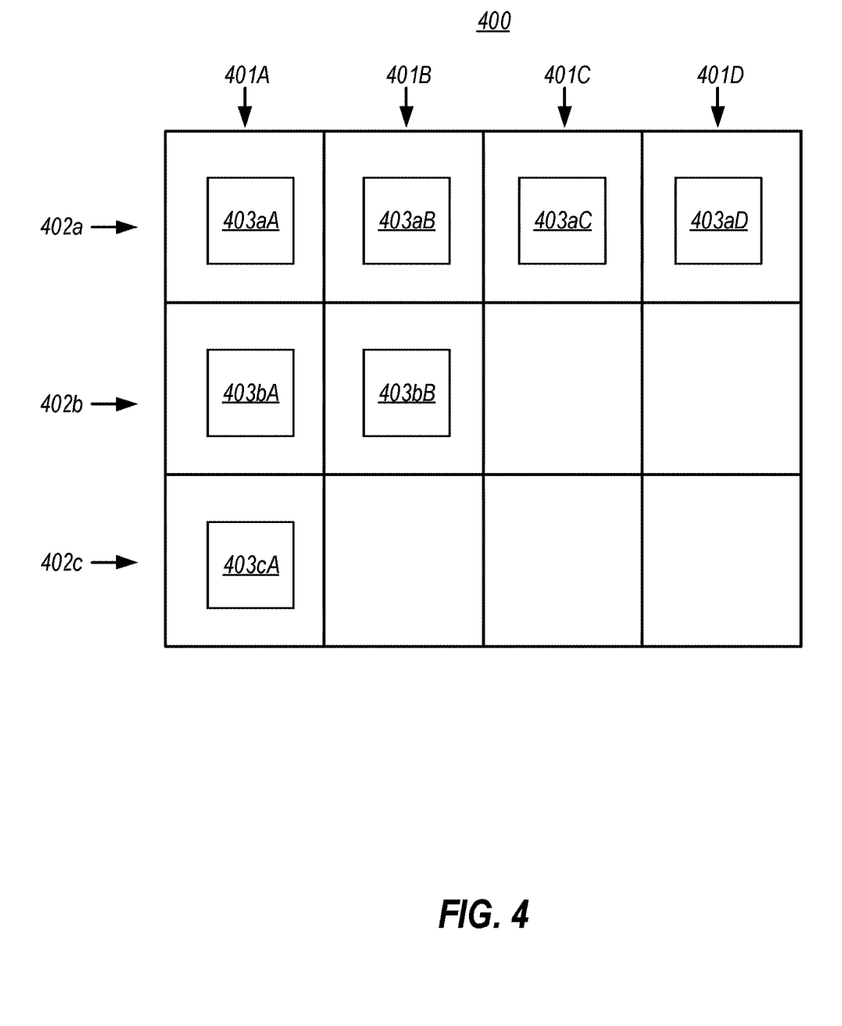
FIG. 4 illustrates a two-dimensional array of configuration information that might be maintained by an identity provider where one dimension represents the user and the other dimension represents the service provider.

As previously mentioned, in order for an identity provider to properly authenticate the user, the user first provides or sets configuration information that is specific to that user and service provider. For instance, FIG. 4 illustrates a two-dimensional array (or table) 400 of configuration information that might be maintained by the identity provider 321. The configuration information need not be organized as a table, but a table is used for purpose of FIG. 4 for purposes of example only, and to demonstrate that configuration information is specific to a combination of a user and a service provider. Furthermore, there may be additional dimensions that may warrant different configuration information. For instance, configuration information may be different by the mode of single sign on. As an example, Security Assertion Markup Language (SAML) is a common mode for single sign on, but there are others. Another example mode is a single password application that requires a single secure password to log into the password service, and then that service will assist in logging in or automatically perform logging into other services thereafter on behalf of the user.

The four columns 401A through 401D correspond to the four service providers 331, 332, 333, and 334. The three rows 402a to 402c corresponds to the three users 311, 312 and 313. The entry in the corresponding row and column represents the configuration information for the combination of the respective row and column. For instance, configuration 403aA, is used when user 311 requests identification to the service provider 331, configuration 403aB is used when user 311 requests identification to the service provider 332, configuration 403aC is used when user 311 requests identification to service provider 333, and configuration 403aD is used when user 311 requests identification to service provider 334. Furthermore, configuration 403bA is used when user 312 requests identification to the service provider 331, and configuration 403bB is used when user 312 requests identification to the service provider 332. Finally for purposes of this example, configuration 403aC is used when user 313 requests identification to the service provider 331.

It is not a trivial task for a user to set up configuration to enable single sign on with a particular identity provider and service provider. Mistakes can easily be made in providing or setting up that configuration information. Accordingly, an error message may often be encountered when a user attempts to perform a single sign on using an identity provider to access a resource hosted by a service provider. The principles provided herein provide significant assistance in testing and troubleshooting such error messages.

Figure 5:
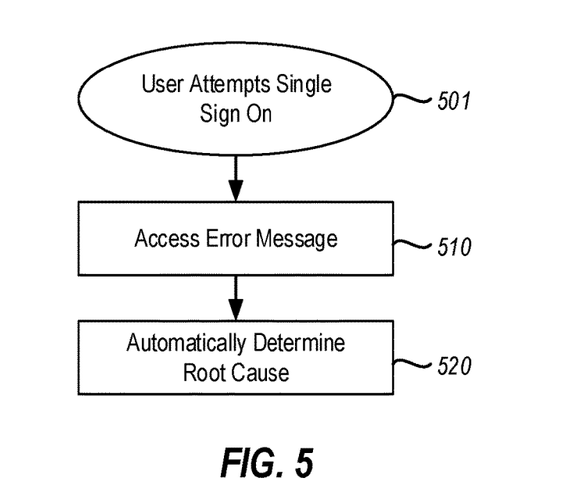
FIG. 5 illustrates a flowchart of a method for troubleshooting a single sign on of a user into a service provider using an identity provider in accordance with the principles described herein.

FIG. 5 illustrates a flowchart of a method 500 for troubleshooting a single sign on of a user into a service provider using an identity provider in accordance with the principles described herein. The method 500 is initiated when a user performs a single sign on attempt into a service provider using an identity provider (initiating event 501). In one particular example which will be referred to herein as the "sign on example", the user 211 of FIG. 2 attempts to gain access to a resource provided by the service provider 231 by signing onto the identity provider 221. Recall that user 311, identity provider 321, and the service provider 331 of FIG. 3 may be the user 211, the identity provider 221, and the service provider 231, respectively, of FIG. 2. Accordingly, the sign on example also involves FIG. 3 in which the user 311 attempts to gain access to a resource provided by the service provider 331 by signing onto the identity provider 321. In FIG. 4, the configuration information that is used by the identity provider 321 to provide an identity for the user 311 to the service provider 331 is the configuration 403aA in column 401A and row 402a. Thus, the success or failure of the single sign on attempt in the sign on example will depend on whether the configuration 403aA is correct.

Ideally, the sign on attempt in the sign on example would be successful. However, in order to illustrate the principles described herein, assume that in the sign on example that an error message is encountered. Accordingly, the method 500 includes accessing an error message (act 510). In the most direct embodiment, the error message is accessed as a response from the identity provider (e.g., in response 202B from identity provider 221). This means that the identity provider (e.g., identity provider 221 or 321 in the sign on example) was not able to authenticate the user (e.g., user 211 or 311 in the sign on example) using the configuration information (e.g., configuration 403aA in the sign on example). In a secondary embodiment, the identity provider (identity provider 221 or 321 in the sign on example) was able to identify the user (e.g., user 211 or 311 in the sign on example) to the service provider (e.g., service provider 231 or 331 in the sign on example) using the configuration information (e.g., configuration 403aA in the sign on example), but that service provider could still not interpret that identity using the data (e.g., a token) provided by the identity provider. This still indicates that the configuration (e.g., configuration 403aA in the sign on example) is not correct.

Figure 6:
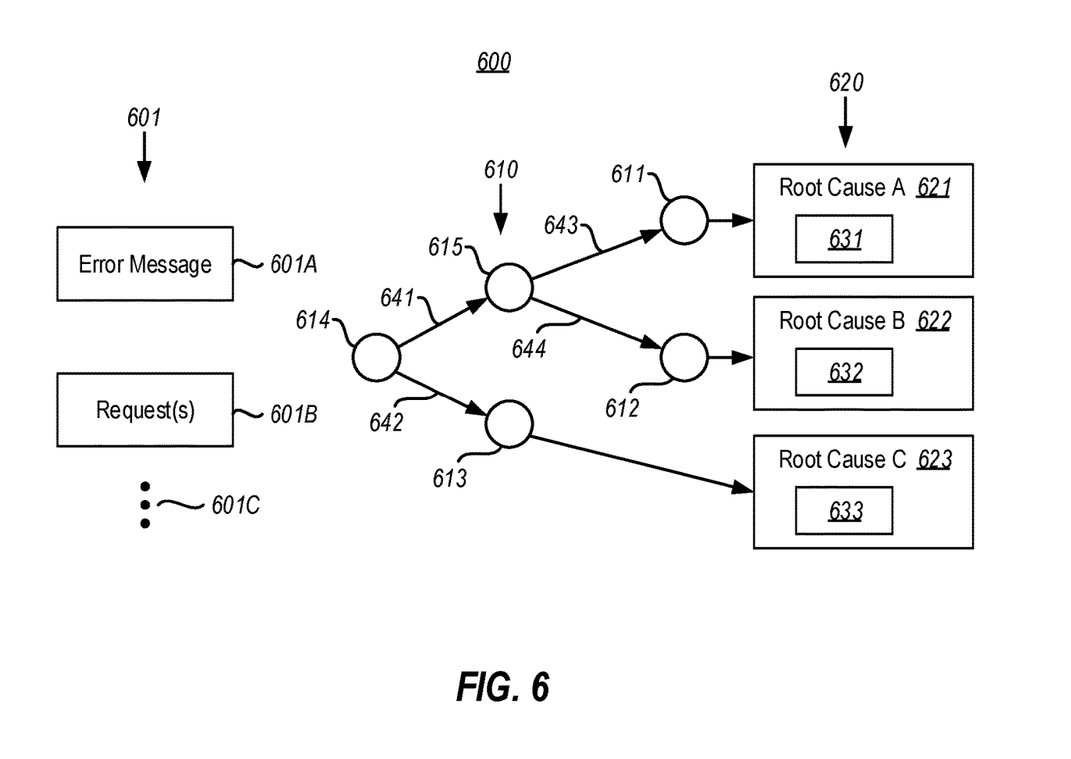
FIG. 6 illustrates a decision tree environment in which decision tree input data is fed to an input tree to generate possible decision tree output data in the form of a root cause of a failure associated with an error message.

In any case, the method 500 includes automatically identifying from at least the error message what a root cause (act 520) of a failure of the single sign on attempt is. Referring to FIG. 6, this be accomplished using a decision tree environment 600 in which decision tree input data 601 is fed to an input tree 610 to generate possible decision tree output data 620. The decision tree 610 in this case is a directed acyclic graph. Each node in the decision tree represents a decision to be made, which decision will depend on the data provided to it. Depending on result of the decision, navigation is made along one of the output directed edges from the node to the next node, and appropriate data is provided also along that directed edge.

For instance, in this case, the input data 601 includes the error message 601A as well as the request (e.g., the request 202A to the identity provider in the sign on example). The root node 614 of the decision tree 600 receives all of this input data and makes a determination of which directed edge 641 or 642 to direct the input data to, and which portions of the input data 601 (if less than all) to direct along that directed edge. If appropriate, the root node 614 could also perform some transform of the input data. Suppose that the navigation proceeds along edge 642 to node 613. Node 613 is a leaf node in the decision tree 610, and corresponds to particular output 623, which indicates that the root cause of the error message is root cause C. In addition, data 633 helpful for expressing the root cause C is also extracted. For instance, the root cause might be that the user identity was expressed as "UserA@domain1.com" whereas the user identity should have been expressed as "UserA@domain1.net". In that case, the information "UserA@domain1.com" would be extracted from the request.

Suppose instead that navigation proceeds along edge 641 to node 615. The node 615 receives data along directed edge 641, and decides which directed edge 643 or 644 to select, and what data to transmit along that directed edge. If navigation proceeds along edge 643 to leaf node 611, the corresponding output is output 621, which is that the root cause is root cause A, along with extracted data 631. On the other hand, if navigation proceeds along edge 644 to leaf node 612, the corresponding output is output 622, which is that the root cause is root cause B, along with extracted data 632.

The decision tree 610 has been kept quite simple in order not to unduly convolute and complicate this description. However, the principles described herein may involve any decision tree of any complexity. In essence, the decision tree mimics the decisions of what a trained technologist would follow if encountering an error message that he/she is fully capable of interpreting. The input data at each node would represent all of the possible relevant information that such a technologist would consider as potentially relevant. The number of root causes might be quite high also. However, the root cause is expressed in a manner that is much more intuitive to a non-trained individual. For example, "you put the wrong user identifier into the identifier field" might be a root cause that is relatively understandable, whereas the raw error message might be far less interpretable. The decision tree 610 may be constructed manually be a trained technologist 610. Alternatively or in addition, the decision tree 610 may be formulated, grown, pruned, edited, and so forth, using machine learning or artificial intelligence.

The ellipsis 601C represents that the set of input data 601 is not restricted to the shown input data 601. Other data might be useful for identifying a root cause. For instance, all or portions of the configuration itself (e.g., configuration 403aA in the sign on example) could be input. Also, in case the error message is from the service provider (e.g., service provider 231 or 331 in the sign on example, that service provider request (e.g., request 203A in the sign on example) may also be provided.

The method 500 may be performed multiple times to test out different configuration, whether for the same user or a different user, for the same identity provider or for a different identity provider, and/or whether for the same service provider or a different service provider.

Figure 7:
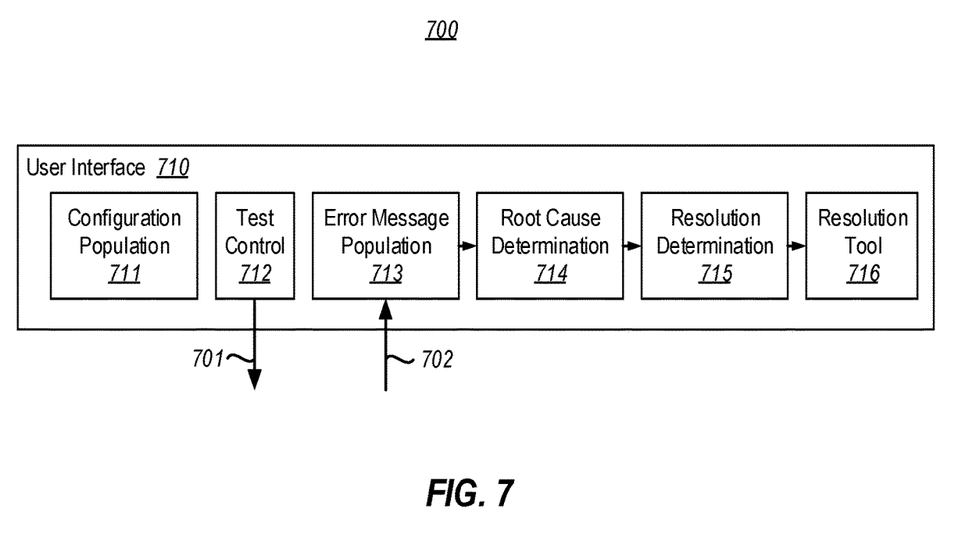

FIG. 7 illustrates a testing and troubleshooting tool environment 700 that may be used to help a user to test and troubleshoot problems when encountering errors performing single sign on. The environment 700 includes a user interface 710 that may be used to present testing and troubleshooting information to a human being or artificial intelligence, as well as receiving input from that human being or artificial intelligence. The user interface 710 may be, for instance, an example of the user interface 112 of FIG. 1.

The user interface 710 includes a configuration population component 711 which a user may interface with to enter, edit, or remove configuration information (e.g., configuration 403aA in the sign on example) into the identity provider (e.g. the identity provider 221 or 321 in the sign on example). The user interface 710 also includes a test control 712 that the user may trigger to initiate the single sign on attempt using the configuration information. The test control 712 allows the user to immediately and conveniently test whether the configuration information the user has just entered will lead to success or failure. This initiation of the single sign on attempt is represented by the arrow 701. At this point, the user may be directed to a sign on page associated with the identity provider.

If the single sign on attempt results in an error message (as represented by arrow 702), that error message 702 may be reported through the user interface 710 to the user. But rather than having to interpret the error message 702 directly, the error message 702 may be fed (either by a manual copy and paste operation of the user, or automatically via an error message population component 713) to a root cause determination component 714. This represents the act 510 of FIG. 5). The root cause determination component 714 then determines the root cause behind the error message (act 520 of FIG. 5), and potentially displays that root cause to the user. As described above, the identification of the root cause may be performed using a decision tree.

The environment 700 may also include a resolution determination component 715 determines a resolution of the identified root cause of the failure of the single sign on attempt. The resolution may follow deterministically once the root cause of the error message is identified. In one embodiment, the resolution identification is also included within the decision tree output data. For instance, the output 621 associated with one root cause may include identifications for one or more resolutions to address that root cause, or maybe even an executable that when triggered would perform the resolution. Also, a resolution tool 716 may be provided that the user may use to execute the determined resolution. Such might be offered to the user via the user interface 710. In response to user interaction with the resolution tool 716, the environment 700 executes the determined resolution.

The components 711 through 716 may be structured as described above for the executable component 106 of the computing system 100 of FIG. 1. Furthermore, if the user interface 710 is provided by a browser, all or some of the components 711 through 716 may be offered by a browser extension. For instance, the error message population component 713 may be part of that browser extension relieving the user from having to manually interact with the user interface 710 in order to provide the error message to the root cause determination module. Furthermore, the root cause determination component 714, the resolution determination component 715, and the resolution tool 716 may be a component of that browser extension, may be a component running below the user interface 710, or may have parts that are within the user interface 710.

The principles described herein allow a user to test ahead of time whether they have provided or set proper configuration information to the identity provider, and potentially correct any problems in the single sign on experience in advance, perhaps well in advance of actually needing a resource provided by the service provider. Thus, the user can more easily configure the single sign on experience, and reduce errors in single sign on attempts during subsequent requests to the service providers. This enhances the performance of the identity provider and service provider as viewed by the end user. Furthermore, the user may be guided through resolution of the root case, or perhaps the resolution may be substantially automated through user interaction with a resolution tool.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable storage media having thereon computer-execution instructions that are structured such that, when executed by the one or more processors, the computing system is caused to troubleshoot a single sign on of a user into a service provider using an identity provider, including instructions that when executed by the one or more processors are configured to cause the computing system to perform the following acts:
displaying on a display an error message generated as a result of a user performing a single sign on attempt into a service provider using an identity provider;
automatically capturing the displayed error message, using a browser extension;
providing the displayed error message to a root cause determination component, using the browser extension;
using the displayed error message, at the root cause determination component, automatically identifying from at least the error message a root cause of a failure of the single sign on attempt; and
displaying on the display the identified root cause in a format different than the displayed error message.

2. The computing system in accordance with claim 1, the error message generated by the identity provider.

3. The computing system in accordance with claim 1, the error message generated by the service provider.

4. The computing system in accordance with claim 1, the computer-readable storage media having thereon computer-execution instructions that are structured such that, when executed by the one or more processors, cause the computing system to perform the following:
  determining a resolution of the identified root cause of the failure of the single sign on attempt.

5. The computing system in accordance with claim 4, the computer-readable storage media having thereon computer-execution instructions that are structured such that, when executed by the one or more processors, cause the computing system to perform the following:
  offering the user a resolution tool that the user may use to execute the determined resolution.

6. The computing system in accordance with claim 5, the computer-readable storage media having thereon computer-execution instructions that are structured such that, when executed by the one or more processors, cause the computing system to perform the following:
  in response to user interaction of the user with the resolution tool, executing the determined resolution.

7. The computing system in accordance with claim 1, the automatic identifying of the root cause being performed by a decision tree that receives at least the error message as input.

8. The computing system in accordance with claim 7, the decision tree also receiving as input a request to the identity provider associated with the single sign on attempt.

9. The computing system in accordance with claim 7, the decision tree also receiving as input a request to the service provider associated with the single sign on attempt.

10. The computing system in accordance with claim 7, the decision tree being formulated or modified in response to machine learning.

11. The computing system in accordance with claim 1, the automatic identification from the at least the error message what the root cause of the failure of the single sign on attempt being performed by a root cause determination component.

12. The computing system in accordance with claim 11, the root cause determination component receiving the error message manually via user interaction, by receiving user input copying and pasting the error message into the determination component.

13. The computing system in accordance with claim 11, the root cause determination component receiving the error message automatically via an error message population component.

14. The computing system in accordance with claim 13, the error message population component being at least part of the browser extension for a browser that is used to perform the single sign on attempt.

15. The computing system in accordance with claim 1, the method being performed by the browser extension.

16. The computing system in accordance with claim 1, the computer-readable storage media having thereon computer-execution instructions that are structured such that, when executed by the one or more processors, cause the computing system to perform the following:
  providing a user interface that that may be used to enter configuration into for the identity provider and the service provider.

17. The computing system in accordance with claim 16, the computer-readable storage media having thereon computer-execution instructions that are structured such that, when executed by the one or more processors, cause the computing system to perform the following:
  providing a control that the user may use to initiate the single sign on attempt using the configuration information.

18. The computing system in accordance with claim 1, the computing system is configured to repeat the acts for at least one of different users, identity providers, or service providers.

19. A method for troubleshooting a single sign on of a user into a service provider using an identity provider, the method comprising:
  displaying on a display an error message generated as a result of a user performing a single sign on attempt into a service provider using an identity provider;
  automatically capturing the displayed error message, using a browser extension;
  providing the displayed error message to a root cause determination component, using the browser extension;
  using the displayed error message, at the root cause determination component, automatically identifying from at least the error message a root cause of a failure of the single sign on attempt; and
  displaying on the display the identified root cause in a format different than the displayed error message.

20. A computer program product comprising one or more computer-readable storage devices having thereon computer-executable instructions that are structured such that, when executed by one or more processors of a computing system, cause the computing system to perform acts for troubleshooting a single sign on of a user into a service provider using an identity provider, including the following:
  displaying on a display an error message generated as a result of a user performing a single sign on attempt into a service provider using an identity provider;
  automatically capturing the displayed error message, using a browser extension;
  providing the displayed error message to a root cause determination component, using the browser extension;
  using the displayed error message, at the root cause determination component, automatically identifying from at least the error message a root cause of a failure of the single sign on attempt; and
  displaying on the display the identified root cause in a format different than the displayed error message.

* * * * *